UNITED STATES PATENT OFFICE.

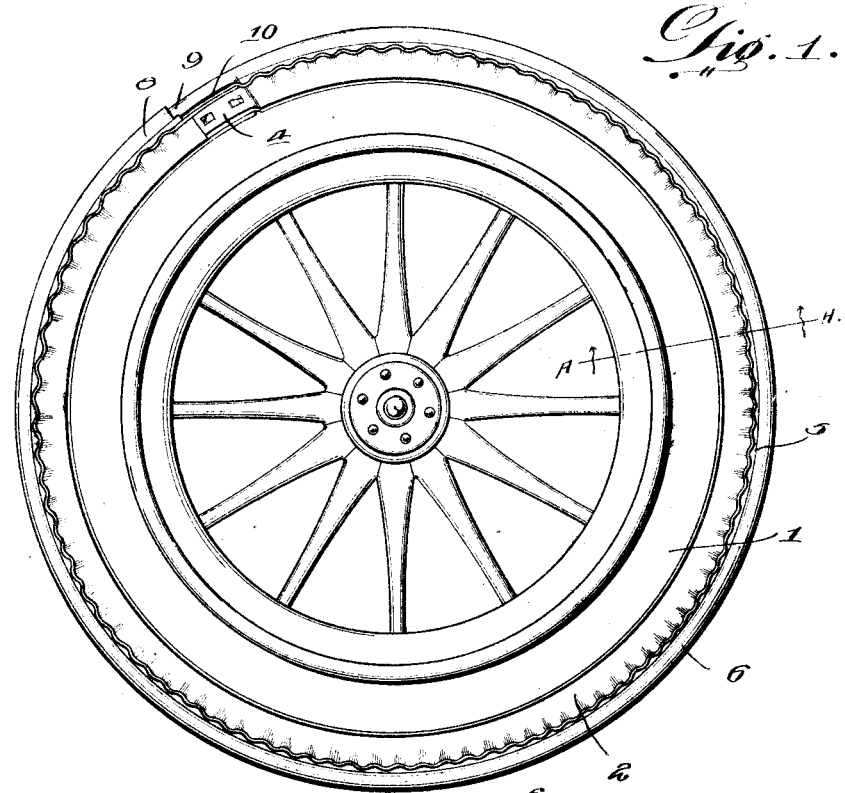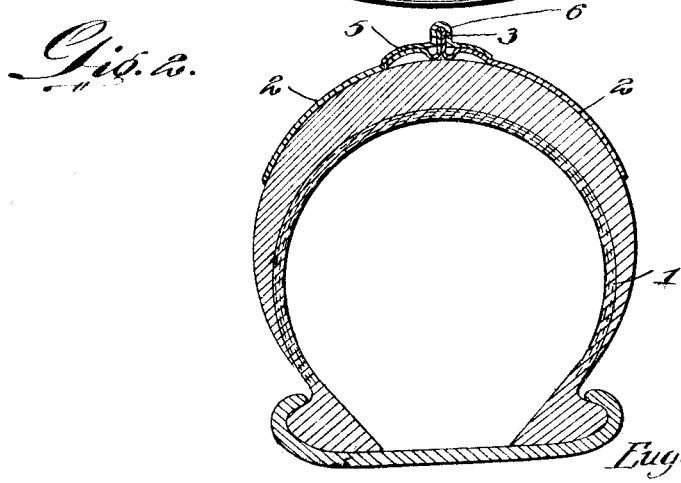

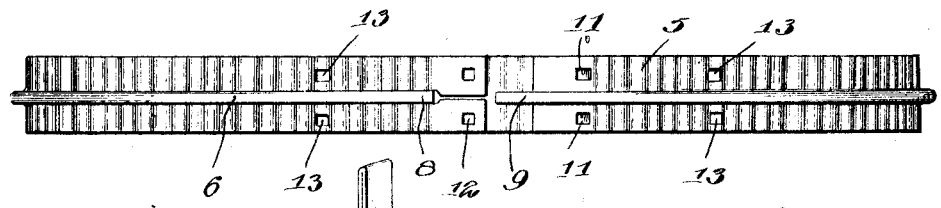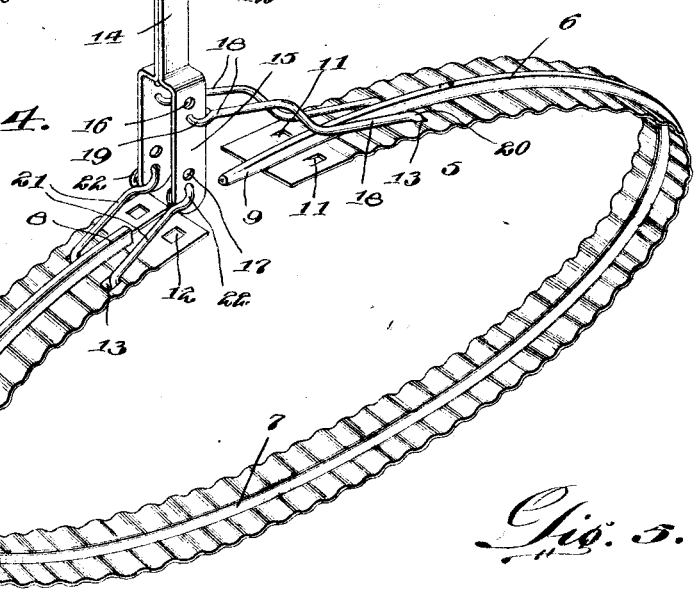

EUGENE B. CURRY, OF PAYSON, ILLINOIS.

TIRE-ARMOR.

1,195,913.　　　Specification of Letters Patent.　　Patented Aug. 22, 1916.

Application filed August 7, 1915. Serial No. 44,265.

*To all whom it may concern:*

Be it known that I, EUGENE B. CURRY, a citizen of the United States, residing at Payson, in the county of Adams and State of Illinois, have invented new and useful Improvements in Tire-Armors, of which the following is a specification.

My invention relates to tire construction and more particularly to tire armors.

The principal object of my invention is to provide an armor for pneumatic tires which completely surrounds the tire and protects the same from punctures, stone bruises or ruptures of any description.

Another object of my invention is to provide a device of this character that in addition to protecting the tire from punctures, prevents the skidding thereof.

Another object of my invention is to provide a tire armor that is cheap and efficient in its construction and which may be easily and readily attached to the tire and removed therefrom.

Other objects of the invention will appear as the nature of the same is better understood from the following description, wherein the specific construction and arrangement of parts are fully set forth in the claims.

In the drawing forming part of this application, like numerals of reference indicate similar parts in the several views and wherein:—

Figure 1 is a side elevation showing my armor attached to the tire. Fig. 2 is a transverse section of Fig. 1 taken on the line A—A. Fig. 3 is a top plan view of the split ring. Fig. 4 is a perspective view of the split ring showing the tool applied thereto. Fig. 5 is a perspective view of one of the annuli. Fig. 6 is a longitudinal section on Fig. 5.

Referring to the drawings in detail, 1 represents a pneumatic tire of any common construction, to which is attached my improved form of armor comprising two annuli 2 embracing the tread of the tire and being arranged side by side thereupon. The annuli are substantially arcuate shaped in cross section and have the confronting edges thereof provided with laterally extending flanges 3. These flanges extend circumferentially of the annuli and have the confronting faces thereof lying contiguous to each other throughout their entire length. In the preferred embodiment of my invention I have found it advantageous to construct the annuli from malleable metal, as this is preferable over cast metal because of the fact that it will prolong the life with minimum chance of the metal breaking. I have, therefore, constructed each of the annuli 2 similarly to a split ring having the terminals thereof overlapping each other, as at 4, the lower overlapped portion being provided with openings adapted to receive depending lugs which are formed on the upper overlapping portion. The inner surface of each of the annuli are provided with spaced depressions adjacent the inner edge thereof which form vacuum chambers between the annuli and the surface of the tire when applied to the latter. Spaced depressions also form a corrugated surface on the outer face of the annuli for purposes hereinafter described.

Encircling the annuli 2 and lying contiguous thereto is a split band 5, which is made of any suitable material, such as metal or the like, and has its intermediate portion bent longitudinally to form a bead 6 on the outer surface thereof and a groove 7 on its inner surface. The body of the split band is corrugated transversely, as at 6′, upon opposite sides of the bead 6 throughout its entire length, the corrugations being of such a contour as to correspond with the corrugated surfaces of the annuli, thereby coöperating with the latter to prevent any circumferential movement of the band. The bead 6 has one end thereof terminating at a point rearwardly of the adjacent end of the band and forming a keeper 8, the opposite end of said bead extending beyond the adjacent end portion of the band to form a lug 9 which is adapted to be received by the keeper 8 when it is in locked position. When the fastening lug 9 is within the keeper 8 the adjacent end portions of the band overlap each other, as at 10, the upper overlapped portion being provided with a pair of depending lugs 11 which are struck from the band at the opposite sides of the bead 6. The under overlapped portion is provided with a pair of rectangular openings 12 which receive the said lugs when in locked position. At a distance from each end the split band 5 is formed with a pair of openings 13 which may be of any suitable contour. These openings are arranged on the band on opposite sides of the bead 6 and are adapted to receive the hook portions of my improved form of tool. This tool comprises a single strip of metal bent upon itself to form a handle 14, the extremities of said handle being bent outwardly and downwardly to form parallel spaced arms 15. Each of the parallel arms 15 is formed with a pair of alined openings 16 adjacent the upper end thereof and a second pair of alined openings 17 adjacent the lower end thereof.

18 designates a pair of gripping arms which are substantially L-shaped, each of which has the upper extremity of the vertical portion thereof bent upon itself to form an eye 19, each of said eyes working in the openings 16. The horizontal portions of the gripping arms 18 have their free ends bent to form hooks 20.

21 designates a pair of relatively short gripping arms, each of which has one extremity thereof bent upon itself to form eyes 22, each of which works within the openings 17. The opposite extremities of each of the said gripping arms are bent to form hooks. The gripping arms 21 extend outwardly from the parallel spaced arms 15 in directions opposite to the gripping arms 18.

It will be seen from the foregoing construction that when the armor is applied to the tire the free ends of the annuli will be locked together by means of inserting the lugs within the keepers, the annuli being then slipped upon the tire and so arranged thereupon as to cause the confronting faces of the laterally extending flanges to contact with each other throughout their entire length. The annuli being of arcuate shape in cross section will conform to the contour of the tire and will closely adhere to the surface thereof and prevent accidental slipping, the extremities of said flanges being so arranged as to terminate at the same point, thereby leaving a flat surface to receive the terminals of the split band. After having placed the annuli upon the tire as just described, the split band is then placed upon the annuli to encircle the same, the walls of the circumferential groove engaging the side walls of the flanges and preventing any lateral movement of the annuli. The tool is then applied to the split band by inserting the hooks of the gripping arms within the openings 13. The tool being gripped by the handle and moved circumferentially of the tire to cause the gripping arms to pull the respective ends together, thereby causing the split band to tightly engage the annuli, will cause the ends of the said band to overlap each other, whereby the lugs 11 will be forced through the openings 12 and the fastening lug will be inserted within the keepers 8. The tool is then removed and, owing to the resiliency of the metal, the lugs will be securely held within the keepers against accidental displacement.

The circumferential spaced depressions formed on the inner walls of the annuli being disposed adjacent the tread of the tire will form vacuum chambers between the tire and the annuli owing to the resilient action of the former. This prevents any circumferential movement of the armor and causes the latter to firmly and securely adhere to the surface of the tire. As previously stated, the corrugated band coöperates with the depressions upon the annuli to prevent circumferential movement of the former, and it will be seen that by this taken in connection with the vacuum chambers in the annuli, any circumferential movement of the armor upon the tire or any relative movement of the parts of the armor will be prevented.

From the foregoing it is thought that the construction and operation of the herein described invention will be apparent to those skilled in the art, and that changes in the size, shape, proportions and details of construction may be made without departing from the spirit or scope of the appended claims.

What is claimed is:—

1. A tire armor comprising a pair of annuli embracing the tire, laterally extending circumferential flanges formed on the inner edge of each of said annuli, said flanges having the confronting faces thereof contacting with each other, a split ring embracing said annuli and formed with the circumferential groove forming the bead, the groove of said bead receiving said flanges, one extremity of the bead extending beyond its adjacent end, the opposite end of said bead terminating rearwardly of its adjacent end and receiving the opposite end of the bead, lugs formed on said band at the opposite sides of said ring adjacent one end thereof, and keepers formed in the remaining end of said band and receiving said lugs.

2. A tire armor comprising two annuli embracing the tread of the tire and arranged in parallel relation to each other, each of said annuli being formed with transversely extending spaced depressions on the inner face thereof to form spaced ridges upon the outer face thereof, and a band embracing the annuli, and corrugated transversely, the corrugations being of such a size as to cause the ridges thereof to lie between the depressions on said annuli whereby circumferential movement of the band will be prevented.

In testimony whereof I affix my signature in presence of two witnesses.

EUGENE B. CURRY.

Witnesses:
  E. J. GABRIEL,
  MARGARET NOWELL.